United States Patent [19]

Okano et al.

[11] Patent Number: 5,221,459

[45] Date of Patent: Jun. 22, 1993

[54] METHOD OF MANUFACTURING A MAGNETIC DISK SUBSTRATE OF TITANIUM

[75] Inventors: Yoko Okano; Hiroyoshi Suenaga; Toshio Sakiyama; Kenji Morita; Masanori Ohmura; Iwao Ida; Hitoshi Nagashima, all of Tokyo, Japan

[73] Assignee: NKK Corporation, Tokyo, Japan

[21] Appl. No.: 874,049

[22] Filed: Apr. 24, 1992

[30] Foreign Application Priority Data

Feb. 12, 1992 [JP] Japan .................................. 4-24871

[51] Int. Cl.⁵ .............................................. C25D 11/26
[52] U.S. Cl. ...................................................... 205/322
[58] Field of Search ......................................... 205/322

[56] References Cited

FOREIGN PATENT DOCUMENTS 52-105804 9/1977 Japan .

OTHER PUBLICATIONS

"Titanium & Zirconium", vol. 37, Jan. 1989, No. 1, pp. 46 and 125–131.

Primary Examiner—T. M. Tufariello
Attorney, Agent, or Firm—Frishauf, Holtz, Goodman & Woodward

[57] ABSTRACT

A method of manufacturing a magnetic disk substrate made of titanium, in which chemical etching is performed on a titanium disk for magnetic disk substrate, thereby removing a surface portion thereof having a thickness of at least 2 nm, and the new surface of the titanium disk, formed by the chemical etching, is anodized, thereby forming anodized film on the titanium disk.

4 Claims, 1 Drawing Sheet

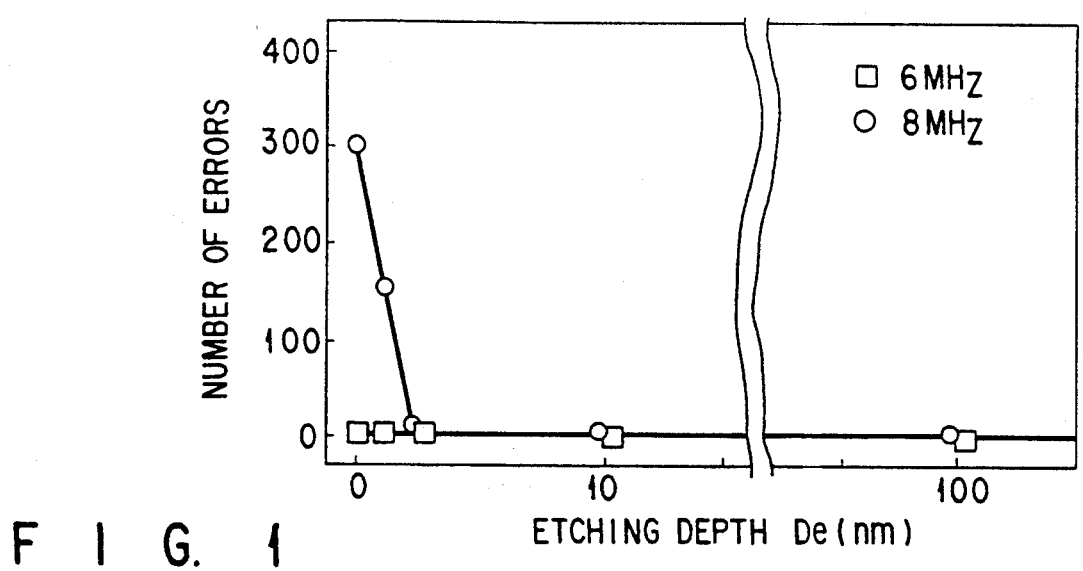
F I G. 1
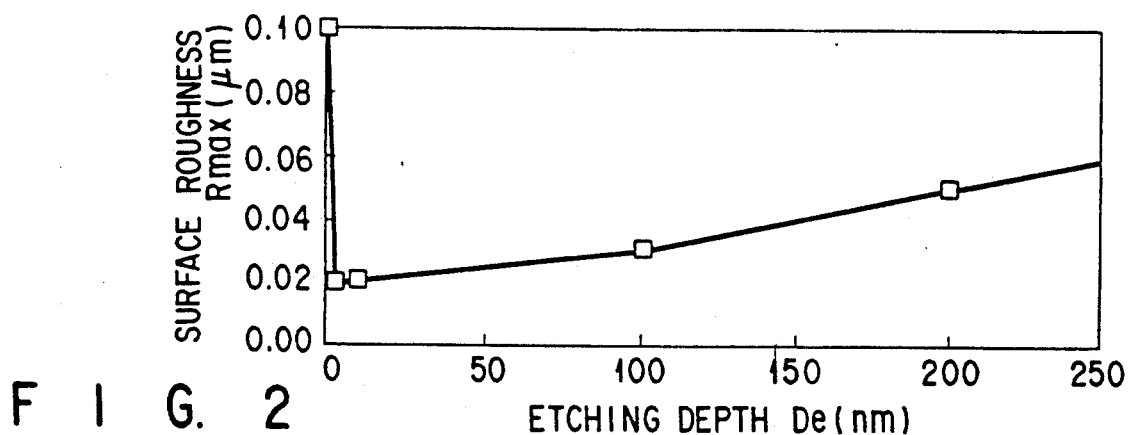
F I G. 2
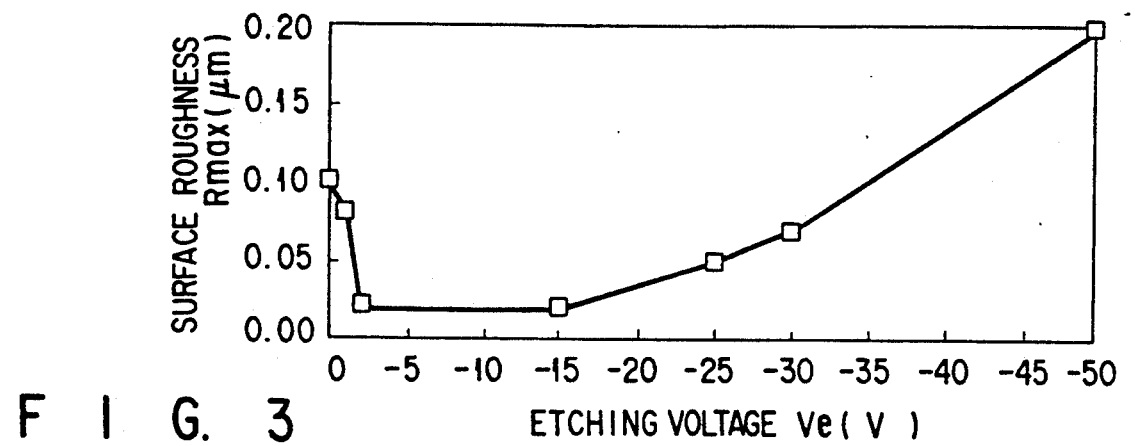
F I G. 3

METHOD OF MANUFACTURING A MAGNETIC DISK SUBSTRATE OF TITANIUM

Background of the Invention 1. Field of the Invention

The present invention relates to a method of manufacturing a magnetic disk substrate of titanium used for a magnetic disk capable of a high density recording reproducing of information.

2. Description of the Related Art

In recent years, it has been attempted to provide magnetic disks which can record a greater amount of data at higher density. It is therefore demanded that a disk substrate be provided on which a magnetic film can be formed to have high S/N ratio and to be free of signal errors such as missing pulses.

Hitherto used as materials of magnetic-disk substrates are aluminum alloys. Recently, titanium has been tried as material of a magnetic-disk substrate, as is disclosed in Published Unexamined Japanese Pat. Application No. 52-105804. This is because various magnetic films having properties differing over a broad range can be formed on titanium substrates by means of sputtering, since titanium is more heat-resistant than aluminum alloys, and it is therefore possible to manufacture a magnetic disk the magnetic film of which has improved recording characteristics.

A magnetic disk comprising a titanium substrate and a magnetic film formed thereon makes a considerable number of signal errors (e.g., missing pulses), however. This is a great bar to the use of titanium as material of a magnetic disk substrate.

SUMMARY OF THE INVENTION

Accordingly it is the object of this invention to provide a method of manufacturing a magnetic disk substrate of titanium which helps to provide a magnetic disk which excels in electromagnetic conversion characteristic, or hardly makes signal errors.

According to the present invention, there is provided a method of manufacturing a magnetic disk substrate of titanium, comprising the steps of: performing chemical etching on a titanium disk to be used for a magnetic disk substrate, thereby removing a surface portion thereof having a thickness of at least 2 nm; and anodizing the new surface of the titanium disk, which has been formed by the chemical etching, thereby forming anodized film on the titanium disk.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a graph illustrating the relationship between the depth De of chemical etching and the number of missing pulses;

FIG. 2 is a graph representing the relationship between the depth De of chemical etching performed on a substrate and the surface roughness which the substrate had after anodized; and FIG. 3 is a graph showing the relationship between the etching voltage Ve applied to a substrate and the surface roughness which the substrate had after it had been anodized.

DETAILED DESCRIPTION OF THE PREFERRED EMBODIMENTS

The inventors hereof have recorded data on, and reproduced the data from, various magnetic disks each comprising a titanium substrate and a magnetic film formed thereon, in their attempt to provide a magnetic disk which has a titanium substrate and which can yet have improved error characteristic. They evaluated the data-recording/reproducing characteristics of these magnetic disks. They have found that the number of missing pulses on each magnetic disk depends on the surface crystallinity of the magnetic disk.

Based on their finding, the inventors formed an anodized film on a titanium substrate and then formed a magnetic film on the anodized film, thereby manufacturing a magnetic disk. Data was recorded on this magnetic disk and reproduced therefrom at the frequency of 6 MHz, while the disk was being rotated at 3600 rpm. The disk generated no missing pulses. The forming of the anodized film was proven a method which can effectively prevent missing pulses.

The inventors found, however, that the anodized film could not perfectly prevent missing pulses when the data was recorded on the magnetic disk at higher densities.

Therefore did they started probing the reason why the anodized film failed to prevent missing pulses completely in the case where data had been recorded in higher densities. Then, they found that the cause of some missing errors was the non-uniformity of the anodized film. The inventors continued their research in order to invent a method of making a uniform anodized film, thereby to prevent missing pulses even if data is recorded on the magnetic disk at higher densities. They found that a uniform anodized film can be made if the titanium substrate is chemically etched, removing its surface portion of a specific thickness, before its surface is subjected to anodic oxidation. The present invention is based on this finding of theirs.

The titanium plate for a magnetic disk substrate needs to be chemically etched prior to the anodic oxidation of its surface, for the following reason. The titanium plate must be mirror-polished before the anodic oxidation. When it is mirror-polished, its surface portion will be altered by the mechanical process and will have strain or defects. An anodized film, if formed on the surface of the substrate, thus altered, is non-uniform and has defects. This i why the mechanically altered surface portion of the substrate is removed by chemical etching which is non-mechanical process, so that an anodized film which is uniform and has no defects is formed on the titanium substrate.

According to the present invention, the depth to which to chemically etch the titanium substrate from a surface thereof is 2 nm or more If the etching depth is less than 2 nm, it is impossible to remove completely that surface portion of the substrate which has been altered by the mirror polishing. Consequently, the titanium substrate cannot have a uniform anodized film having an appropriate surface roughness. This makes it impossible to manufacture a magnetic disk which generates no missing pulses even when data is recorded on it at high frequencies.

It is desirable that the chemical etching depth be not more than 200 nm. If the etching depth exceeds 200 nm, the crystals of titanium substrate will be etched at different speeds, inevitably increasing the surface roughness of the substrate to an excessive value, although the substrate should have maximum surface roughness $R_{max}$ of 0.05 μm.

In this invention, any etchant can be used that chemically etches titanium. Examples of the etchant are various acid washing solutions, sulfuric acidhydrofluoric acid washing solutions, and hydrogen peroxide-hydrofluoric acid washing solutions—all disclosed in Titanium-Zirconium, Vol. 37 (1989).

The chemical etching is performed, while applying a negative DC voltage Ve to the titanium substrate, whereby an excessive increase in the surface roughness of the substrate is effectively prevented. Preferably, the negative DC voltage Ve is −2V to −25V. If the voltage Ve is smaller than −2V (the absolute value of Ve is lower than 2V), the substrate cannot be etched sufficiently. If the voltage Ve is larger than −25V (the absolute value of Ve is higher than 25V), hydrogen compounds will be formed on the surface of the substrate, increasing the surface roughness of the substrate over the roughness $R_{max}$ of 0.05μ.

The anodized film is formed for the purpose of preventing the titanium substrate from impairing the crystal orientation of the underlayer formed immediately beneath the anodized film or the crystal orientation of the magnetic layer. It is desirable that the anodized film have a thickness of 2 to 350 nm. If the anodized film is thinner than 2 nm, the substrate is likely to degrade the crystal orientation of the beneath layer and that of the magnetic film. If the anodized film is thicker than 350 nm, both the underlaying film and the magnetic film will be more likely oxidized.

As has been described, the titanium substrate is first chemically etched, not mechanically processed at all, and is then subjected to anodic oxidation. Hence, the substrate, thus prepared, helps to provide a magnetic disk which excels in electromagnetic conversion characteristic and hardly generates missing pulses even if data is recorded on it at high densities.

The present invention is not limited to a magnetic disk substrate made of pure titanium. Rather, it can also be applied to magnetic disk substrates made of various titanium alloys, and magnetic disk substrates of titanium or a titanium alloy having hardened surface layer.

EXAMPLE

An example of the method of manufacturing a titanium substrate, according to this invention, will now be described.

Disks of pure titanium for magnetic disk, all having a diameter of 2.5 inches, were mirror-polished to a surface roughness $R_{max}$ of 0.02 μm. The mirror-polished titanium disks, which had a thickness of 0.89 mm, were chemically etched with various acid solutions and washed with pure water. These titanium disks were anodized under various conditions.

More specifically, the titanium disks were chemically etched to various depths ranging from 0 nm to 500 nm, while applying various DC voltages Ve ranging from 0 to −50V to these titanium disks. Each disk was anodized with 0.1 vol% aqueous solution of phosphoric acid used as electrolytic solution, using a pure titanium anode spaced apart by 2 cm from the titanium disk, and applying an anodizing voltage Vao of 10 to 150V to the anode, thereby forming an anodized film which had a thickness ranging from 2 nm to 350 nm.

Thereafter, various titanium substrates, thus prepared, were subjected to sputtering conducted in vacuum of $1 \times 10^{-3}$ Torr, while maintaining the substrates at 250° C. A Cr-based underlying film having a thickness of 100 nm and a Co-system magnetic film (i.e., a Co(84)-Cr(14)-Ta(2) film) having a thickness of 60 nm were thereby formed sequentially on each titanium substrate. Further, a protective carbon film having a thickness of 30 nm and a liquid lubricant layer of Freon were formed sequentially on each titanium substrate. Thus, various magnetic disks were manufactured.

These magnetic disks were tested for their missing-error characteristics. To be more specific, a certifier was used, counting the number of missing pulses each magnetic disk generated. In the certifier, the magnetic disk was driven at 3600 rpm, and data was recorded on the disk and reproduced therefrom at two different frequencies of 6 MHz and 8 MHz, while maintaining the magnetic head floating 0.075 μm off the recording surface of the magnetic disk.

Surface roughness was measured at 50 randomly selected points on the anodically oxidized surface of each titanium substrate by means of a contact-type roughness meter, and the average of the surface roughnesses at these points was evaluated as the surface roughness of the titanium substrate.

The conditions of the chemical etching and anodic oxidation and the results of the test on the magnetic disks were as is shown in the following Table 1, in which HF and $H_2O_2$ stand for 47% hydrofluoric acid solution and 31% hydrogen peroxide solution, respectively.

TABLE 1

| | Etchant | | Etching Depth (nm) De | Voltages Applied (V) | | Surface Roughness of Anodized Substrate (μm) | Missing Pulses (One side) | |
|---|---|---|---|---|---|---|---|---|
| | | | | Etching Ve | Anodic Oxidation Vao | | 6 MHz | 8 MHz |
| 1 | Not used | | 0 | 0 | 80 | 0.10 | 0 | 300 |
| 2 | HF | 1.0 wt % | 1 | −15 | 80 | 0.02 | 0 | 150 |
| | $H_2O_2$ | 40.0 wt % | | | | | | |
| 3 | HF | 1.0 wt % | 2 | −15 | 80 | 0.02 | 0 | 0 |
| | $H_2O_2$ | 40.0 wt % | | | | | | |
| 4 | HF | 1.0 wt % | 10 | −15 | 80 | 0.02 | 0 | 0 |
| | $H_2O_2$ | 40.0 wt % | | | | | | |
| 5 | HF | 1.0 wt % | 100 | −15 | 80 | 0.03 | 0 | 0 |
| | $H_2O_2$ | 40.0 wt % | | | | | | |
| 6 | HF | 1.0 wt % | 200 | −15 | 80 | 0.05 | 0 | 0 |

TABLE 1-continued

| | Etchant | | Etching Depth (nm) De | Voltages Applied (V) | | Surface Roughness of Anodized Substrate (μm) | Missing Pulses (One side) | |
|---|---|---|---|---|---|---|---|---|
| | | | | Etching Ve | Anodic Oxidation Vao | | 6 MHz | 8 MHz |
| 7 | HF H$_2$O$_2$ | 1.0 wt % 40.0 wt % | 300 | −15 | 80 | 0.07 | 0 | 0 |
| 8 | HF H$_2$O$_2$ | 1.0 wt % 40.0 wt % | 500 | −15 | 80 | 0.13 | 0 | 0 |
| 9 | HF H$_2$O$_2$ | 1.0 wt % 40.0 wt % | 2 | −15 | 10 | 0.02 | 0 | 0 |
| 10 | HF H$_2$O$_2$ | 1.0 wt % 40.0 wt % | 2 | −15 | 110 | 0.03 | 0 | 0 |
| 11 | HF H$_2$O$_2$ | 1.0 wt % 40.0 wt % | 2 | −15 | 150 | 0.03 | 0 | 0 |
| 12 | HF H$_2$O$_2$ | 1.0 wt % 40.0 wt % | 2 | −1 | 80 | 0.08 | 0 | 0 |
| 13 | HF H$_2$O$_2$ | 1.0 wt % 40.0 wt % | 2 | −2 | 80 | 0.02 | 0 | 0 |
| 14 | HF H$_2$O$_2$ | 1.0 wt % 40.0 wt % | 2 | −15 | 80 | 0.02 | 0 | 0 |
| 15 | HF H$_2$O$_2$ | 1.0 wt % 40.0 wt % | 2 | −25 | 80 | 0.05 | 0 | 0 |
| 16 | HF H$_2$O$_2$ | 1.0 wt % 40.0 wt % | 2 | −30 | 80 | 0.07 | 0 | 0 |
| 17 | HF H$_2$O$_2$ | 1.0 wt % 40.0 wt % | 2 | −50 | 80 | 0.20 | 0 | 0 |
| 18 | HF NHO$_3$ | 0.3 wt % 1.3 wt % | 2 | −15 | 80 | 0.02 | 0 | 0 |
| 19 | HF NHO$_3$ | 0.3 wt % 1.3 wt % | 200 | −15 | 80 | 0.05 | 0 | 0 |
| 20 | HF HNO$_3$ | 0.3 wt % 1.3 wt % | 300 | −15 | 80 | 0.07 | 0 | 0 |
| 21 | HF HNO$_3$ | 0.3 wt % 1.3 wt % | 2 | −1 | 80 | 0.07 | 0 | 0 |
| 22 | HF HNO$_3$ | 0.3 wt % 1.3 wt % | 2 | −30 | 80 | 0.06 | 0 | 0 |
| 23 | HF—H$_2$SO$_4$ system | | 2 | −15 | 80 | 0.02 | 0 | 0 |
| 24 | HF—H$_2$SO$_4$ system | | 200 | −15 | 80 | 0.05 | 0 | 0 |
| 25 | HF—H$_2$SO$_4$ system | | 300 | −15 | 80 | 0.07 | 0 | 0 |
| 26 | HF—H$_2$SO$_4$ system | | 2 | −1 | 80 | 0.07 | 0 | 0 |
| 27 | HF—H$_2$SO$_4$ system | | 2 | −30 | 80 | 0.06 | 0 | 0 |
| 28 | HF—HNO$_3$ system | | 2 | −15 | 80 | 0.02 | 0 | 0 |
| 29 | HF—HNO$_3$ system | | 200 | −15 | 80 | 0.05 | 0 | 0 |
| 30 | HF—HNO$_3$ system | | 300 | −15 | 80 | 0.07 | 0 | 0 |
| 31 | HF—HNO$_3$ system | | 2 | −1 | 80 | 0.07 | 0 | 0 |
| 32 | HF—HNO$_3$ system | | 2 | −30 | 80 | 0.06 | 0 | 0 |
| 33 | HF—CrO$_3$ system | | 2 | −15 | 80 | 0.02 | 0 | 0 |
| 34 | HF—CrO$_3$ system | | 200 | −15 | 80 | 0.05 | 0 | 0 |
| 35 | HF—CrO$_3$ system | | 300 | −15 | 80 | 0.07 | 0 | 0 |
| 36 | HF—CrO$_3$ system | | 2 | −1 | 80 | 0.07 | 0 | 0 |
| 37 | HF—CrO$_3$ system | | 2 | 30 | 80 | 0.06 | 0 | 0 |
| 38 | HF—HCl system | | 2 | −15 | 80 | 0.02 | 0 | 0 |
| 39 | HF—HCl system | | 200 | −15 | 80 | 0.05 | 0 | 0 |
| 40 | HF—HCl system | | 300 | −15 | 80 | 0.07 | 0 | 0 |
| 41 | HF—HCl system | | 2 | −1 | 80 | 0.07 | 0 | 0 |
| 42 | HF—HCl system | | 2 | −30 | 80 | 0.06 | 0 | 0 |

As is evident from Table 1, any magnetic disk the titanium substrate of which had been chemically etched to a depth De of 2 nm or more generated no missing pulses even when data was recorded and reproduced at the higher frequency of 8 MHz, whatever etchant had been applied and whichever anodic oxidation conditions had been applied.

FIG. 1 is a graph illustrating the relationship between the depth De of chemical etching and the number of missing pulses, which was recorded of the magnetic disks manufactured by etching titanium substrates with the etchant formed of 1.0 wt % of 47% hydrofluoric acid solution and 40 wt % of 31% hydrogen peroxide solution, while applying voltage Ve of −15V to the substrate, and by anodically oxidized the substrates, while applying voltage Vao of 80V to the anode. As FIG. 1 shows, the magnetic disk the substrate of which had been chemically etched to the depth De of less than 2 nm generated missing pulses when data was recorded or reproduced at the higher frequency of 8 MHz. By contrast, any magnetic disk the substrate of which had been chemically etched to the depth of 2 nm or more generated no missing pulses at all, even when data was recorded or reproduced at 8 MHz.

As can be understood from Table 1 and FIG. 1, any titanium substrate had surface roughness R$_{max}$ of more than 0.05 μm if it had been etched to a depth greater than 200 nm, while being applying with an etching voltage Ve of smaller than −2V or larger than −25V.

FIG. 2 is a graph representing the relationship between the etching depth De and the surface roughness R$_{max}$, which was recorded of the magnetic disks manufactured by etching titanium substrates with the etchant formed of 1.0 wt % of 47% hydrofluoric acid solution and 40 wt % of 31% hydrogen peroxide solution, while applying voltage Ve of −15V to the substrate, and by anodically oxidized the substrates, while applying voltage Vao of 80 V to the anode. As is clearly understood from FIG. 2, the surface roughness $R_{max}$ exceeded 0.05 μm when the etching depth De was more than 200 nm.

FIG. 3 is a graph showing the relationship between the etching voltage Ve and the surface roughness, which was recorded of the magnetic disks manufactured by etching titanium substrates with the etchant formed of 1.0 wt % of 47% hydrofluoric acid solution and 40 wt % of 31% hydrogen peroxide solution, while applying voltage Ve of −15V to the substrate, and by anodically oxidized the substrates, while applying voltage Vao of 80V to the anode. As FIG. 3 obviously shows, the surface roughness $R_{max}$ exceeded 0.05 μm when the etching voltage applied to the substrate was less than −2V or more than −25V.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A method of manufacturing a magnetic disk substrate made of titanium, comprising the steps of:
    performing chemical etching on a titanium disk to be used for a magnetic disk substrate, thereby removing a surface portion thereof having a thickness of at least 2 nm; and
    anodizing the new surface of the titanium disk, which has been formed by the chemical etching, thereby forming anodized film on the titanium disk.

2. The method according to claim 1, wherein that surface portion of said titanium disk, which is removed by chemical etching, has a thickness of 200 nm at most.

3. The method according to claim 1, wherein a negative DC voltage ranging from −2V to −25V is applied to said titanium disk during the chemical etching.

4. The method according to claim 1, wherein the anodized film formed on said titanium disk has a thickness ranging from 2 nm to 350 nm.

* * * * *